(12) United States Patent
Pao et al.

(10) Patent No.: US 7,438,444 B2
(45) Date of Patent: Oct. 21, 2008

(54) LIGHT GUIDE LENS AND LIGHT EMITTING DIODE PACKAGE STRUCTURE HAVING THE LIGHT GUIDE LENS

(75) Inventors: Yu-Nan Pao, Hsinchu Hsieh (TW); Po-Hung Yao, Hsinchu Hsieh (TW); Tsung-Hsin Lin, Hsinchu Hsieh (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 11/611,574

(22) Filed: Dec. 15, 2006

(65) Prior Publication Data
US 2007/0273984 A1 Nov. 29, 2007

(30) Foreign Application Priority Data
May 25, 2006 (TW) .............................. 95118529 A

(51) Int. Cl.
*F21V 5/00* (2006.01)
(52) U.S. Cl. .................. 362/327; 362/337; 362/331; 362/332; 362/335
(58) Field of Classification Search ................. 362/327, 362/800, 337, 331, 332, 335
See application file for complete search history.

(56) References Cited
U.S. PATENT DOCUMENTS
6,607,286 B2 * 8/2003 West et al. .................. 362/255

| | | | |
|---|---|---|---|
| 6,679,621 B2 | 1/2004 | West et al. | |
| 2002/0080615 A1 | 6/2002 | Marshall et al. | |
| 2003/0156425 A1 * | 8/2003 | Turnbull et al. | ............. 362/545 |
| 2006/0044806 A1 * | 3/2006 | Abramov et al. | ............ 362/337 |

FOREIGN PATENT DOCUMENTS
CN 1687831 10/2005

* cited by examiner

*Primary Examiner*—Stephen F Husar
*Assistant Examiner*—Jessica L McMillan
(74) *Attorney, Agent, or Firm*—WPAT, P.C.; Anthony King

(57) ABSTRACT

A light guide lens includes a lens body having a light incidence surface and a light emission surface, a plurality of refraction structures formed on the light incidence surface, and a plurality of reflection structures formed on the light emission surface. The refraction structures send incoming light rays to the light emission surface by refraction. Each of the refraction structures turns incoming light rays coming in all directions into refracted parallel light rays. The refracted parallel light rays arriving from the refraction structures reflect off the corresponding reflection structures and then laterally exit the lens body. The refracted parallel light rays arriving from each of the refraction structures travel to a corresponding one of the reflection structures, such that eventually the incoming light rays exit laterally. The present invention further provides a light emitting diode package structure having the light guide lens.

16 Claims, 8 Drawing Sheets

LIGHT GUIDE LENS AND LIGHT EMITTING DIODE PACKAGE STRUCTURE HAVING THE LIGHT GUIDE LENS

BACKGROUND OF THE INVENTION

1. Field of the Invention

The present invention relates to light guide lenses and light emitting diode (LED) package structures, and more particularly, to a light guide lens and a light emitting diode (LED) package structure for turning incident LED light coming in all directions into laterally exiting light.

2. Description of the Prior Art

Backlight modules of conventional liquid crystal displays use mostly cold cathode fluorescent lamps (CCFLs) as light sources. Cold cathode fluorescent lamps, however, contain mercury, consume too much power and have short lifetime. Hence, the current trend is toward replacing cold cathode fluorescent lamps by light emitting diodes (hereinafter referred to as LEDs) when designing the light sources of backlight modules. LEDs are durable and contamination-free. Red, green, blue monochromatic LEDs have advantages, such as a single wavelength and a wide color gamut, and thus resultant liquid crystal display (LCD) images are brightly colored and delicately outlined. However, an LED is a point source and thereby is unlikely to provide uniform illumination for a light emission surface of a backlight module, and in consequence granular hot spots are visible in front of the backlight module.

From an optical point of view, uniform illumination emerges as light travels further away from a point source. Inasmuch as the appeal of LCDs lies in the compactness thereof, an LCD whose uniform illumination-providing surface source is fabricated at the cost of a thickened backlight module is necessarily bulky and thereby is hardly in line with the trend of LCD products. In order to enhance the practicability of LED backlight modules, U.S. Pat. Nos. 6,607,286 and 6,679,621 disclose a lens structure configured for lateral emission of LED light with a view to providing uniform illumination.

Referring to FIG. 1 which is a schematic view of a lens cap disclosed in U.S. Pat. No. 6,607,286, the lens cap 1 mounted on a light emitting diode 2 comprises a concave inner surface 10 and a serrate outer surface 11. The light emitting diode 2 is covered by the inner surface 10 of the lens cap 1. Light rays emitted by the light emitting diode 2 penetrate the inner surface 10 before being refracted by the outer surface 11 and then exiting laterally; among the light rays, oblique rays have to undergo total internal reflection once before being refracted and exiting.

The serrate contour of the outer surface 11 is designed in accordance with calculations relating to the incoming directions of light rays from the light emitting diode 2 such that eventually the light rays laterally exit the outer surface 11. However, the serrate outer surface 11 can only direct incoming light rays at a rough target, and thus it is not true that light rays coming in any direction necessarily exit laterally. In particular, light rays emitted in the direction of the top of the light emitting diode 2 inevitably bring about a hot spot. Hence, in practice, the lens cap 1 is superimposed by a transparent panel having an affixed reflective sheet configured to hide the hot spot from view, thus resulting in a complicated, high-cost assembly process.

As mentioned above, incident light undergoes refraction or total internal reflection once and then goes through refraction once before exiting laterally. Where light travels from an optically denser medium to a less dense medium, loss of light energy increases with an incident angle. LCD illumination is affected as a result of the loss of light energy when light emitted by the light emitting diode 2 is refracted by the lens cap 1.

The serrate structure of the outer surface 11 of the lens cap 1 is so complicated that it has to be fabricated by means of a combination of dies, thus increasing production costs.

In addition, U.S. Pat. No. 6,679,621 has the aforesaid drawbacks. Accordingly, an issue that needs an urgent solution is related to endeavors to overcome the aforesaid drawbacks.

SUMMARY OF THE INVENTION

In light of the aforesaid drawbacks of the prior art, it is a primary objective of the present invention to provide a light guide lens for turning incident light into laterally exiting light.

Another objective of the present invention is to provide a light guide lens such that an assembly process thereof is simplified.

Yet another objective of the present invention is to provide a light guide lens such that manufacturing costs thereof are reduced.

A further objective of the present invention is to provide a light guide lens for making good use of light energy.

In order to achieve the above and other objectives, the present invention discloses a light guide lens for turning incident light coming in all directions into laterally exiting light. The light guide lens comprises a lens body, a plurality of refraction structures, and a plurality of reflection structures. The lens body further comprises a light incidence surface for receiving incident light and a light emission surface for emitting outgoing light. The plurality of refraction structures are formed on the light incidence surface and configured to refract the incident light such that the incident light travels toward the light emission surface. Each of the refraction structures turns incident light rays coming in all directions into parallel light rays by refraction. The plurality of reflection structures are formed on the light emission surface such that light rays from the refraction structures reflect off the reflection structures and laterally exit the lens body. Each of the reflection structures receives the refracted parallel light rays from a corresponding one of the refraction structures such that the incident light rays exit laterally.

The present invention also discloses a light emitting diode package structure having the light guide lens. The light emitting diode package structure comprises a light emitting diode and a light guide lens. The light emitting diode is electrically mounted on a carrier component. The light guide lens is secured in position to the carrier component. The light guide lens further comprises a lens body having two opposing surfaces, namely a light incidence surface and a light emission surface. The light incidence surface mantles the light emitting diode and is provided with a plurality of refraction structures for refracting light rays from the light emitting diode such that the refracted light rays turn to the light emission surface. Each of the refraction structures turns incident light rays coming in all directions into refracted parallel light rays. The light emission surface is provided with a plurality of reflection structures such that light rays from the refraction structures reflect off the reflection structures and laterally exit the light guide lens. Each of the reflection structures receives the refracted parallel light rays from a corresponding one of the refraction structures such that the incident light rays exit laterally.

The light guide lens is made of a resin or a transparent polymer. Light is provided by a point source, such as a light emitting diode. Each of the refraction structures is a convex surface with a single center of curvature. As put forth by the Gaussian optical theory, where a light incidence surface is designed in such a way that the focus of each refraction structure coincides with the light source, light rays coming in all directions will become parallel refracted light rays after crossing the same convex surface. Each of the reflection structures is an inclined plane with a slope designed to vary depending on the incoming directions of the light rays to be refracted by the refraction structure and by the Law of Reflection which states that the incident angle always equals the reflected angle, and thus most of the light rays laterally exit the lens body. In addition, the light emission surface further comprises a plurality of planes. The planes are perpendicular to the reflected light rays so as to allow the reflected light rays to penetrate and leave the lens body. Inasmuch as lateral emission of light is already achieved by total internal reflection, a light emission surface can function well provided that the light emission surface is perpendicularly disposed.

Unlike the prior art wherein inefficient lateral emission of light necessitates equipping a backlight module with auxiliary structures, such as a transparent light guide plate and a reflective sheet, for prevention of hot spots, the present invention discloses a light guide lens for allowing light to exit a lens body mostly laterally by means of refraction structures and reflection structures and achieving uniform illumination from a point source. Accordingly, unlike the prior art, the present invention makes an assembly process simpler.

Loss of light energy accompanies refraction-based lateral emission of light in accordance with the prior art. By contrast, with a light guide lens of the present invention, lateral emission of light occurs whenever totally reflected light rays pass through a plane perpendicular thereto, thus minimizing the loss of light energy.

A refraction-oriented serrate outer surface of the prior art is complex and thereby difficult to fabricate. By contrast, a light guide lens of the present invention has a light emission surface provided with reflection structures and planes; each of the reflection structures is an inclined plane, whereas the planes are perpendicular to outgoing light rays; the structural simplicity decreases the number of dies used and thereby reduces manufacturing costs.

DETAILED DESCRIPTION OF THE EMBODIMENTS

The present invention is herein illustrated with specific embodiments, so that one skilled in the pertinent art can easily understand other advantages and effects of the present invention from the disclosure of the invention.

Figure 1:
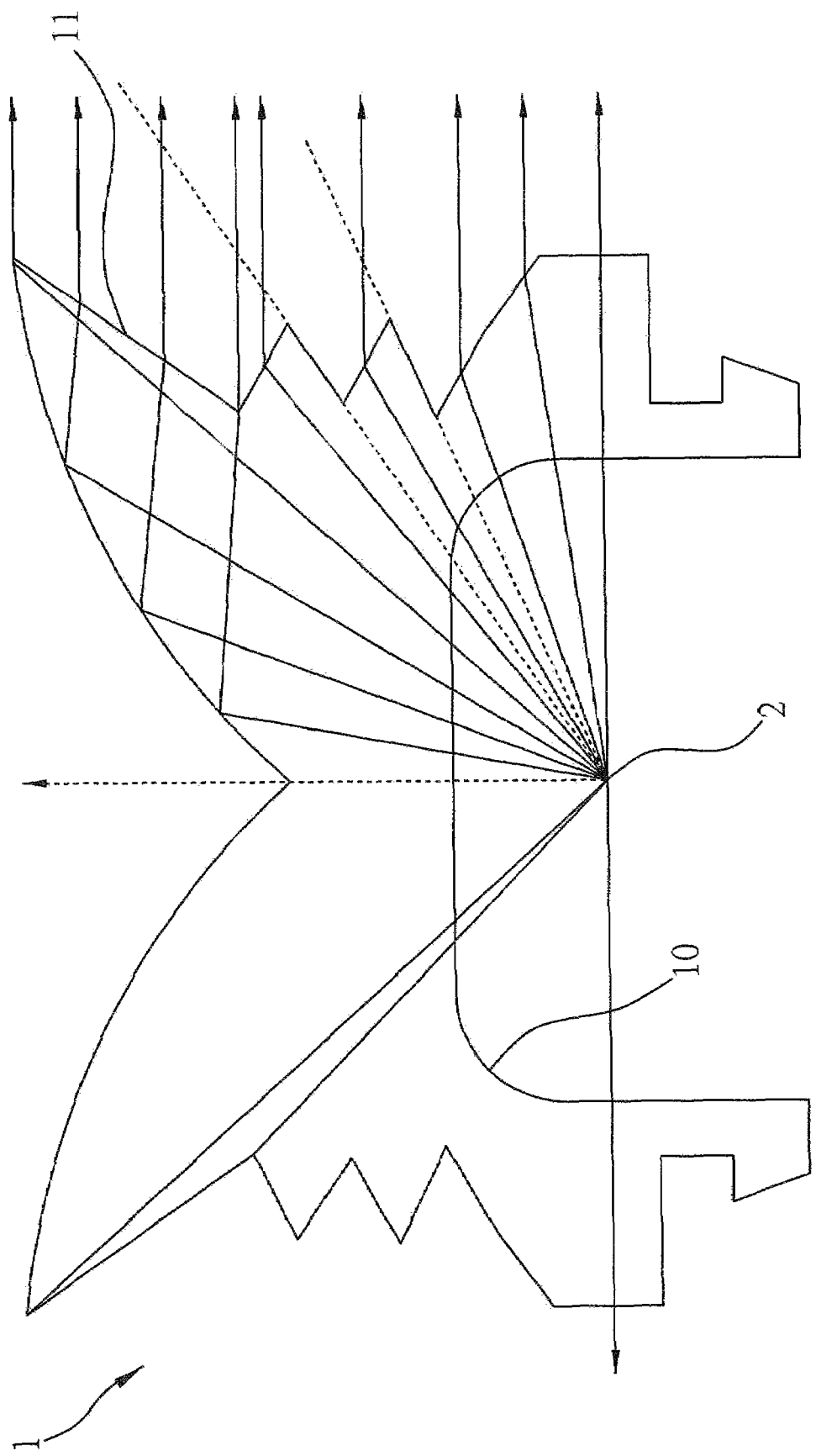
FIG. 1 (PRIOR ART) is a schematic view of a lens cap disclosed in U.S. Pat. No. 6,607,286.
Figure 2:
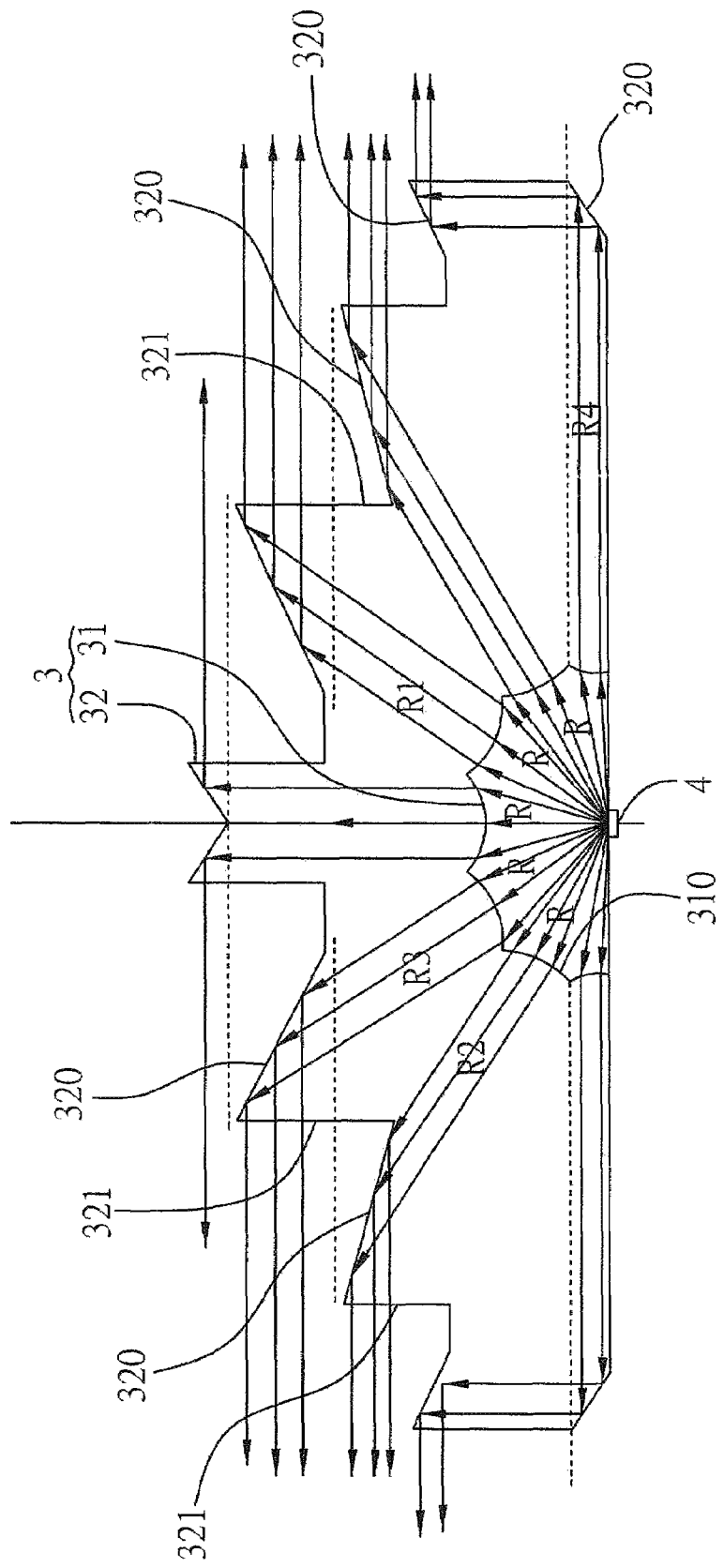
FIG. 2 is a schematic view of a preferred embodiment of a light guide lens in accordance with the present invention.

Referring to FIG. 2 which is a schematic view of a preferred embodiment of a light guide lens in accordance with the present invention, the light guide lens turns incident light rays R coming in all directions into laterally exiting light rays R. The light guide lens comprises a lens body 3, a plurality of refraction structures 310, and a plurality of reflection structures 320. The lens body 3 further comprises a light incidence surface 31 for receiving incident light rays R and a light emission surface 32 for emitting outgoing light rays R. The lens body 3 is made of one of a resin and a transparent polymer. The plurality of refraction structures 310 are formed on the light incidence surface 31 and configured to refract incident light rays R such that the incident light rays R turn to the light emission surface 32. Each of the refraction structures 310 turns the incident light rays R coming in all directions into refracted parallel light rays. The plurality of reflection structures 320 are formed on the light emission surface 32 such that the refracted light rays R arriving from the refraction structures 310 reflect off the reflection structures 320 and laterally exit the lens body 3. Each of the reflection structures 320 receives the refracted parallel light rays R from a corresponding one of the refraction structures 310 such that the incident light rays R exit laterally.

The incident light rays R are supplied by a point source 4. The point source 4 is a light emitting diode. The refraction structures 310 are convex surfaces formed on the light incidence surface 31. The refraction structures 310 adjoin each other and fully cover the light incidence surface 31 so as to refract the incident light rays R coming in all directions. The incident light rays R coming in all directions from the point source 4 are refracted by the refraction structures 310 and thereby turned into light rays R1, R2, R3 and R4 and light rays exiting in other directions.

The reflection structures 320 comprise inclined planes with various slopes and receive the light rays R1, R2, R3 and R4 and light rays traveling in other directions (the terms "light rays traveling in other directions" are hereinafter referred to as "other light rays"). With the reflection structures 320, the light rays R1, R2, R3 and R4 and other light rays exit laterally by total internal reflection. The slope of each of the reflection structures 320 depends on the incoming directions of the corresponding light rays R1, R2, R3 and R4 and other light rays. The light rays R1, R2, R3 and R4 and other light rays travel from the refraction structures 310 to the respective reflection structures 320 by refraction. The lens body 3 is an optically dense medium, whereas air is an optically less dense medium. Total internal reflection occurs to the reflection structures 320, provided that an incident angle of the light rays R1, R2, R3 and R4 and other light rays falling on the reflection structures 320 is greater than a certain angle. The slopes of the reflection structures 320 are conducive to lateral emission of the light rays R1, R2, R3 and R4 and other light rays. The light emission surface 32 further comprises a plurality of planes 321 perpendicular to the reflected light rays R1, R2, R3 and R4 and other light rays reflected such that the reflected light rays R1, R2, R3 and R4 and other light rays reflected penetrate and exit the lens body 3. Inasmuch as lateral emission of light is already achieved by total internal reflection, a light emission surface can function well provided that the light emission surface is perpendicularly disposed.

According to fundamental optical theories, total internal reflection incurs almost no energy loss, and energy loss is minimized with an incident angle of zero. Hence, the present invention provides maximum emission of light.

The more horizontal an incident light ray is, the more horizontal and larger the inclined plane of a matching reflection structure 320 is. However, horizontal light rays, such as the light rays R4, undergo two total internal reflections by two reflection structures 320 respectively before exiting laterally. A noteworthy point is: a reflection structure 320 corresponding to relatively horizontal light occupies relatively more space without going against the current trend toward large but thin liquid crystal display panels, because the reflection structure 320 is elongated laterally rather than thickened vertically.

Figure 3A:
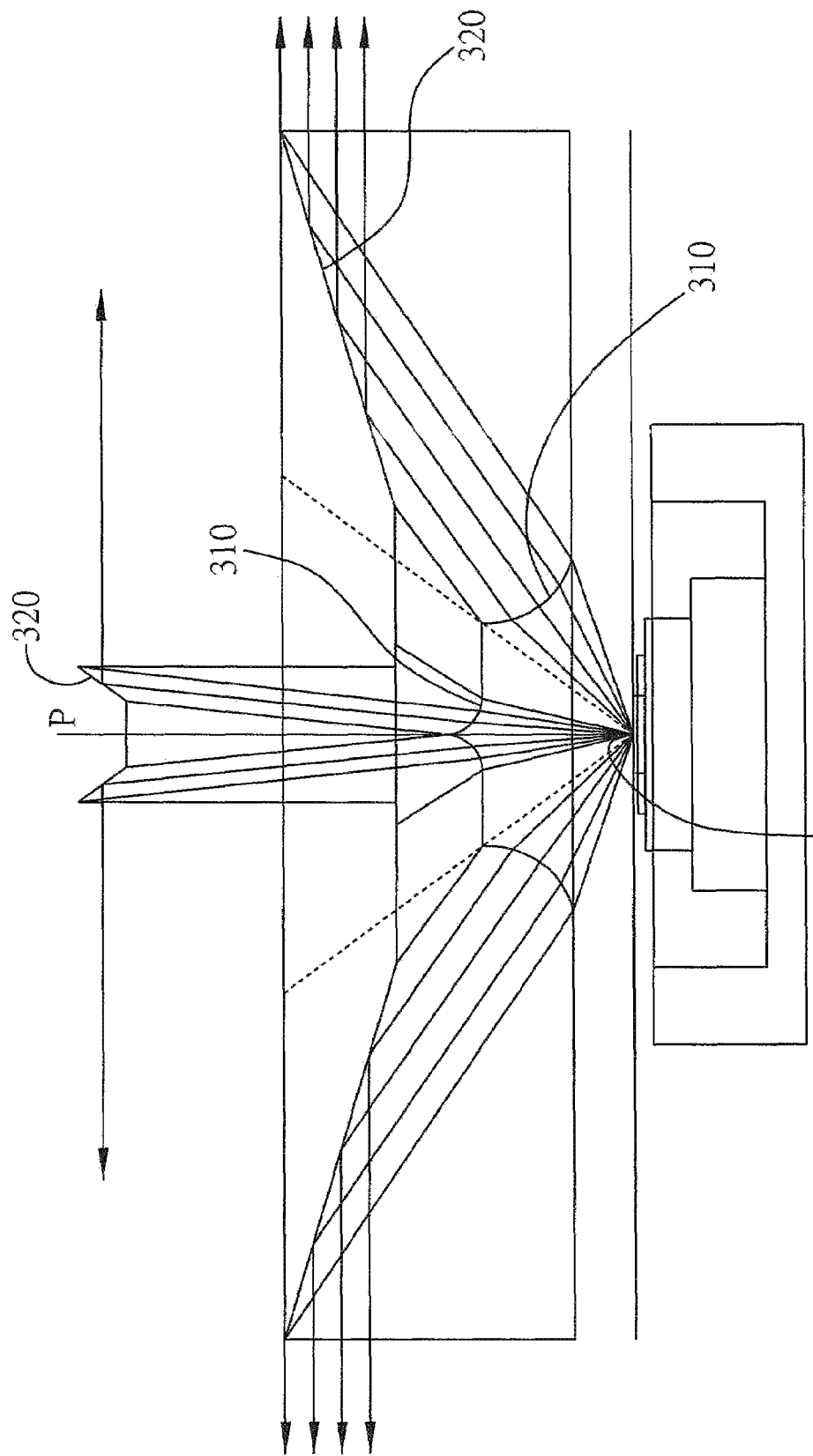
FIG. 3A is a schematic view of another preferred embodiment of a light guide lens in accordance with the present invention.

FIG. 3A which is a schematic view of another preferred embodiment of a light guide lens in accordance with the present invention. The principles underlying this embodiment and illustrated with FIG. 3A are the same as those underlying the preceding embodiment and illustrated with FIG. 2 except that a light guide lens of this embodiment comprises two refraction structures 310 and two corresponding reflection structures 320.

Figure 3B:
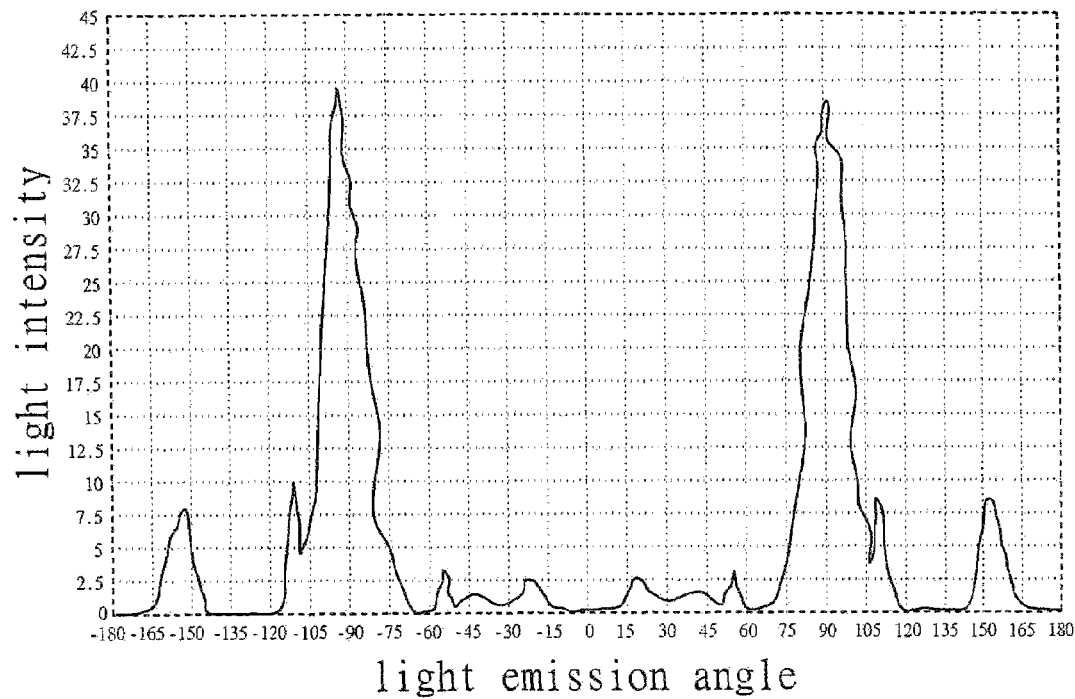
FIGS. 3B and 3C show the numerical simulation curves for a light guide lens of the present invention and the prior art respectively.
Figure 3C:
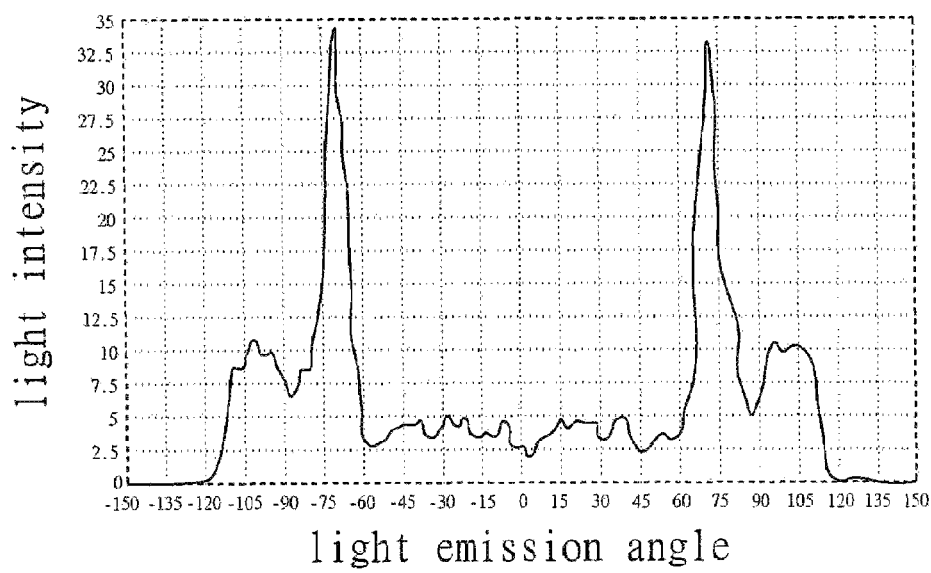

Referring to FIGS. 3B and 3C, which show the numerical simulation curves for a light guide lens of the present invention and the prior art respectively, maximum intensity of light rays exiting the light guide lens of the present invention occurs when the light rays exit a light emission surface at a light emission angle of 91° to the normal P, whereas maximum intensity of light rays exiting by the prior art occurs in the presence of a mere 70° light emission angle, indicating that light rays laterally exit the light guide lens of the present invention more efficiently, compared with the prior art. As regards small light emission angles to the normal P, the intensity of light rays exiting the light guide lens of the present invention is markedly low in comparison with that of the prior art. Hence, compared to the prior art, the light guide lens of the present invention is less likely to bring about hot spots when used in a liquid crystal display. On the other hand, even though the light guide lens of the present invention comprises only two refraction structures 310 and two reflection structures 320 and thereby cannot always emit light rays laterally, results of numerical simulation reveal that the light emission rate of the light guide lens of the present invention is still high (92.8%), compared to the light emission rate (81.1%) of the prior art.

Figure 3D:
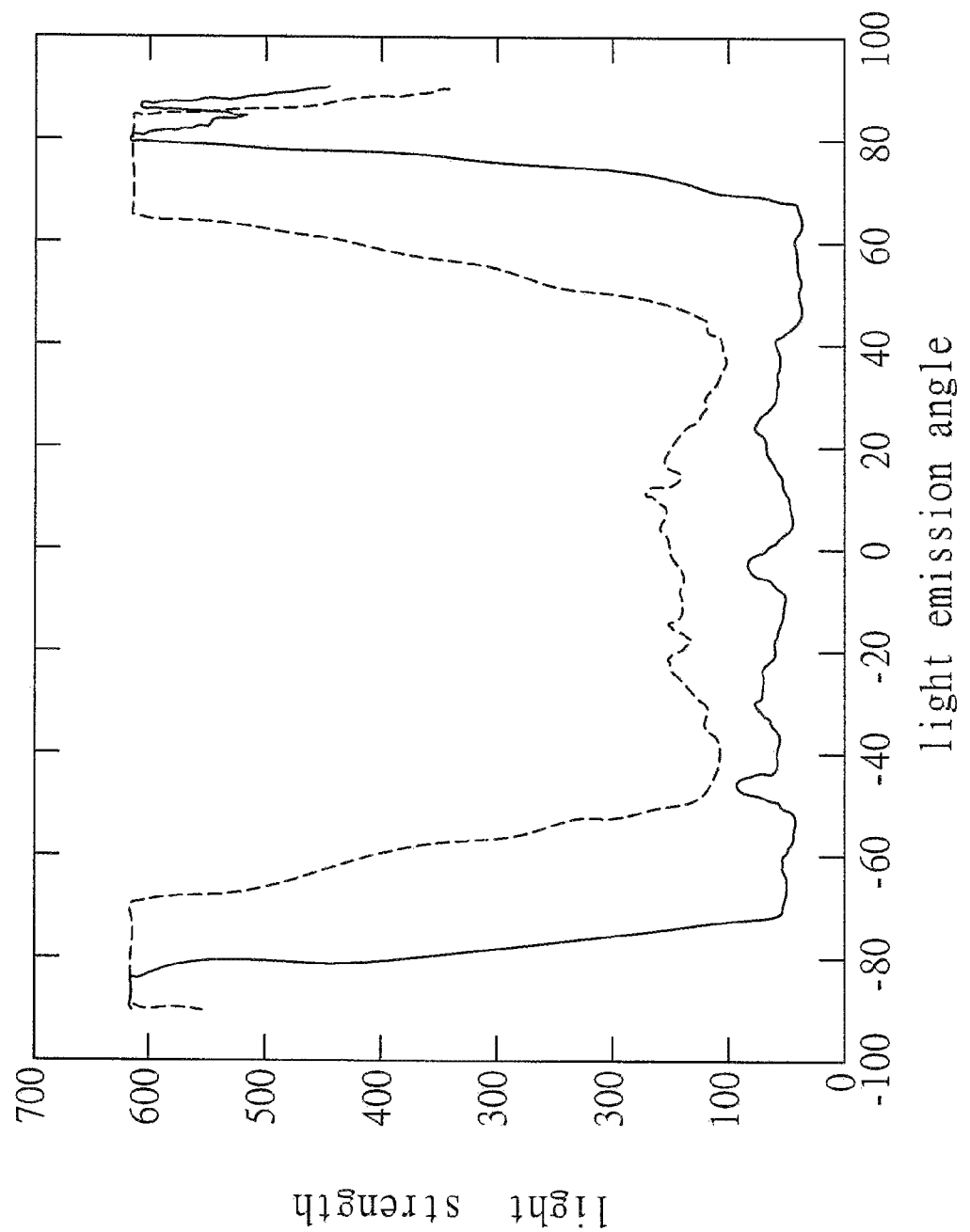
FIG. 3D shows the experimental curves for a light guide lens of the present invention and the prior art respectively.

Referring to FIG. 3D, findings of a test show that maximum intensity of light rays exiting the light guide lens of the present invention (indicated by a solid line) occurs when the light rays exit a light emission surface at a light emission angle of 80° to the normal P, whereas maximum intensity of light rays emitted by the prior art (indicated by a dash line) occurs in the presence of a 60° light emission angle. As regards small light emission angles to the normal P, the test shows that the intensity of light rays exiting the light guide lens of the present invention is also less than that of the prior art. And further, the test shows that the light guide lens of the present invention has a 95% light emission rate.

Compared to the prior art, the light guide lens of the present invention not only emits light rays more horizontally and thereby provides uniform illumination, but also emits light rays with relatively low intensity, wherever hot spots are likely to occur to the liquid crystal display.

Figure 4A:
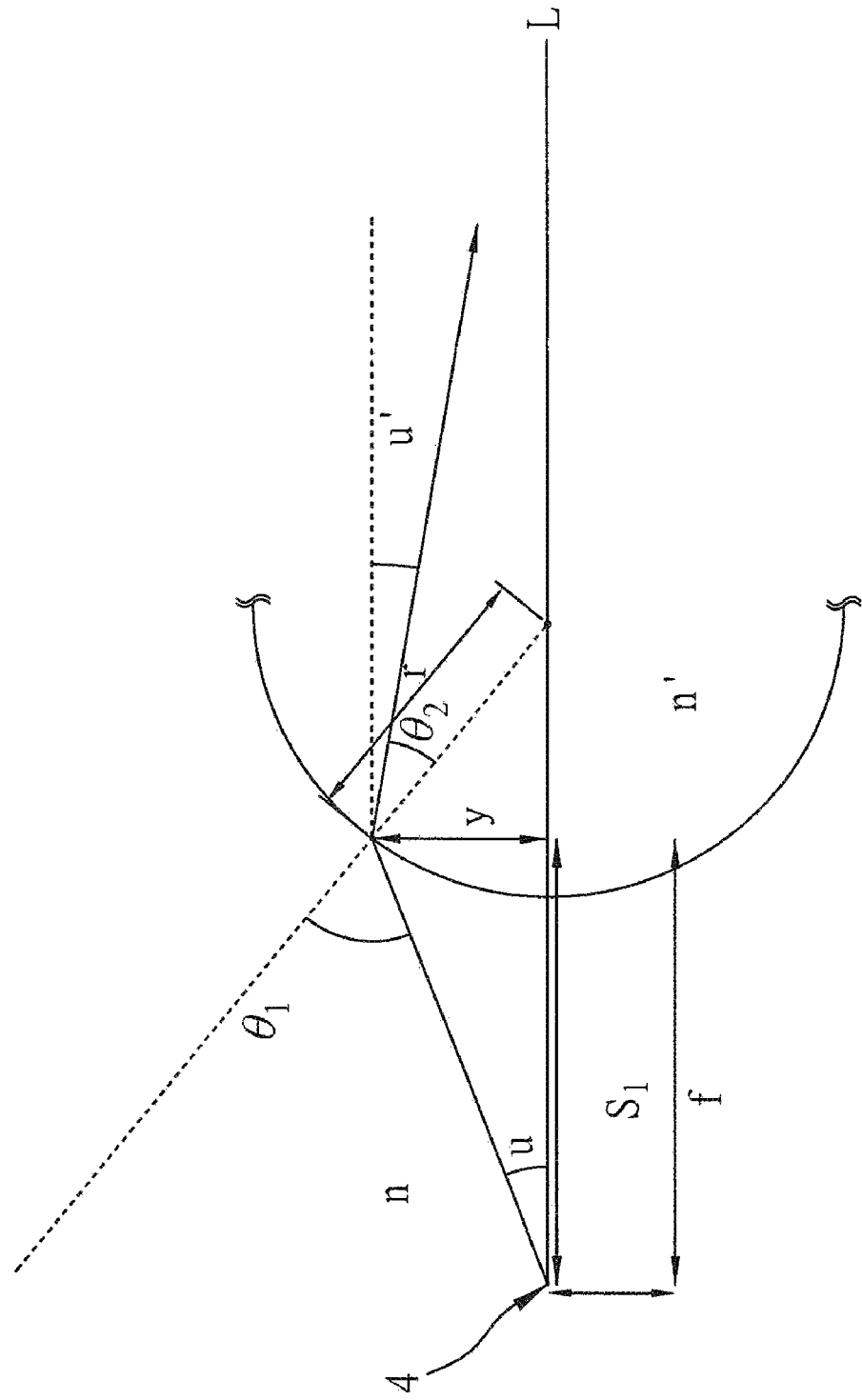
FIGS. 4A and 4B illustrate how a light guide lens of the present invention turns light rays coming in all directions into parallel light rays by refraction.

FIG. 4A depicts an optical phenomenon which occurs to a refraction structure 310 and a point source 4, and the depiction helps illustrate how a light guide lens of the present invention turns light rays coming in all directions into parallel light rays by refraction. To make explanations simpler, notations are as follows:

L: an optical axis of the refraction structure 310
n: the refractive index of air
n': the refractive index of the lens body 1
$S_1$: a distance between the point source 4 and the refraction structure 310
u: an included angle between a light ray from the point source 4 and the optical axis L
u': an included angle between the refracted light ray and the optical axis L
y: a distance between a point of refraction and the optical axis L
$\theta_1$: the incident angle of the light ray
$\theta_2$: the refracted angle of the refracted light ray
r: the radius of curvature of the refraction structures 310

The refraction structure 310 is a convex surface with only one center of curvature. The convex surface is part of a spherical mirror. Based on the Gaussian optical theory, a focal distance of the refraction structure 310 is expressed by Equation (1).

$$f = \frac{-nr}{n' - n}, \qquad (1)$$

where f<0 (because the focal distance f and the center of curvature lie on opposite sides across the interface.)

Based on the assumption that if both $\theta_1$ and $\theta_2$ approach zero, $\sin \theta_1$ will approximate $\theta_1$, whereas $\sin \theta_2$ will approximate $\theta_2$, and thus Snell's Law ($n\sin\theta_1 = n'\sin\theta_2$) can be approximated as Equation (2) below.

$$n\theta_1 = n'\theta_2 \qquad (2)$$

Afterward, by substituting the expression $$\theta_1 = u + \frac{y}{r}$$

and the expression $$\theta_2 = \frac{y}{r} - u'$$

into Equation (2), a light tracing equation, i.e. Equation (3), is derived as follows:

$$n'u' = nu + \frac{n' - n}{r} y \qquad (3)$$

In addition, $S_1$ may be approximated to $$\frac{y}{u}.$$

As asserted by the Gaussian optical theory, the refractive index of air, n, is deemed 1. Considering that light rays from the point source 4 have to coincide with the optical axis L, it is necessary for refracted light rays to be parallel to the optical axis L in order to enable lateral emission of light.

Hence, the expression u'=0 is obtained and then substituted into Equations (1) and (3) along with the expression n=1, resulting in the expression $$\frac{n'-1}{r} = -\frac{u}{y}$$

and the expression $$f = \frac{r}{n'-1}.$$

Eventually, the expression $$f = \frac{y}{u} = S_1$$

is obtained.

Accordingly, as indicated above, upon entry into the lens body 3, light rays are refracted and paralleled the optical axis L, provided that the focus of the refraction structure 310 coincides with the point source 4.

Figure 4B:
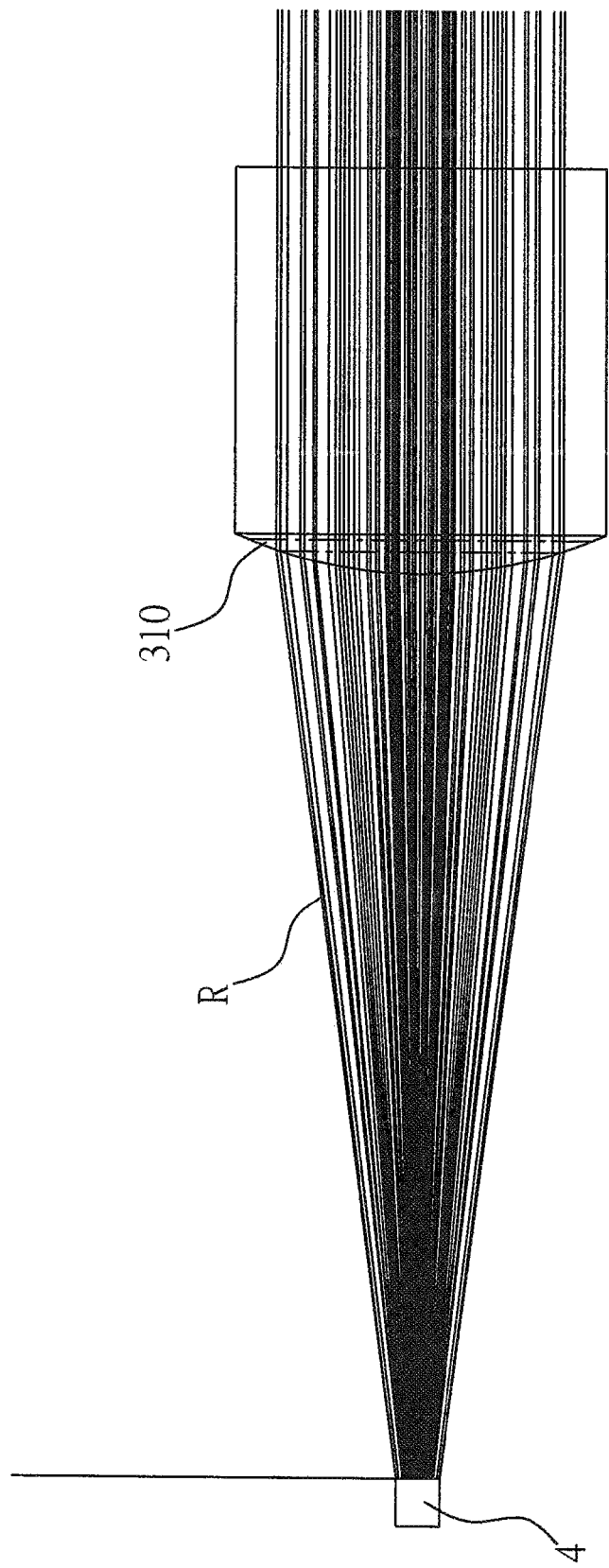

Referring to FIG. 4B, the light rays R coming in all directions from the point source 4 exit laterally when refracted by the refraction structure 310.

The above-mentioned is a summary description of the objectives of the present invention. Detailed inference is based on known optical theories which are apparent to persons ordinarily skilled in the field of optics, and thus a description of the known optical theories is omitted herefrom.

In addition to a convex surface, the refraction structure 310 can be a fresnel structure which refracts incident light rays coming in all directions such that the refracted light rays exit in a direction parallel to the optical axis.

Figure 5:
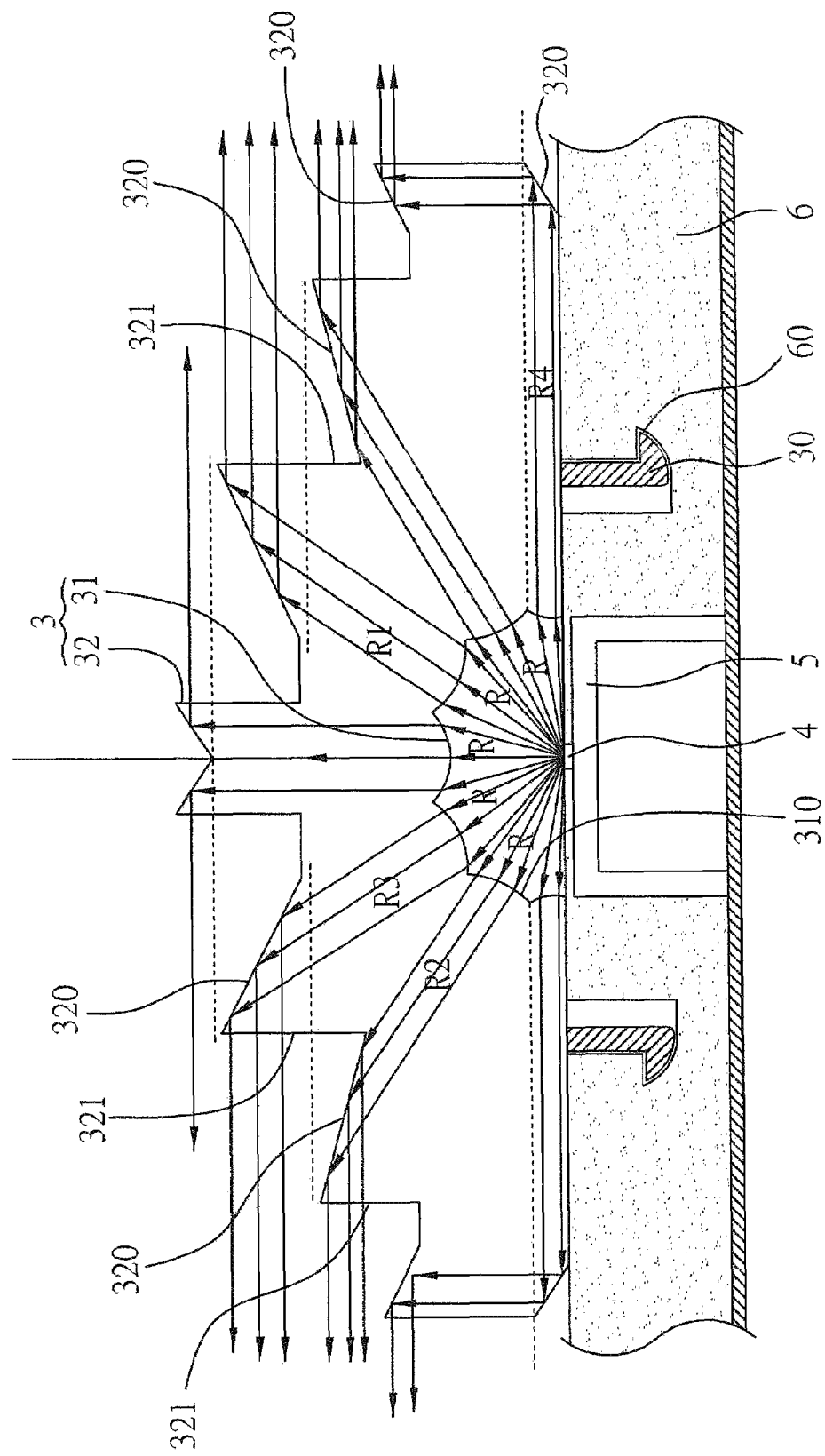
FIG. 5 is a schematic view of a preferred embodiment of a semiconductor package in accordance with the present invention.

Referring to FIG. 5, the present invention discloses a light emitting diode package structure having a light guide lens. The light emitting diode package structure comprises a point source 4 and a light guide lens. The point source 4 is electrically mounted on a carrier component 5. The light guide lens is secured in position to the carrier component 5. The light guide lens further comprises a lens body 3 having two opposing surfaces, namely a light incidence surface 31 and a light emission surface 32. The light incidence surface 31 mantles the point source 4 and is provided with a plurality of refraction structures 310 for refracting light rays R from the point source 4 such that the light rays R turn to the light emission surface 32. Each of the refraction structures 310 turns the light rays R coming in all directions into refracted parallel light rays. The light emission surface 32 is provided with a plurality of reflection structures 320 such that light rays R1, R2, R3 and R4 from the refraction structures 310 reflect off the reflection structures 320 and laterally exit the light guide lens. Each of the reflection structures 320 only receives parallel refracted light rays R1, R2, R3 and R4 from a corresponding refraction structure 310 such that eventually the incident light rays R exit laterally.

The point source 4 is a light emitting diode. The carrier component 5 is a lead frame. On a surface of the carrier component 5 an encapsulant 6 is formed so as to secure in position the point source 4. The encapsulant 6 is coupled to the light guide lens. Formed between the encapsulant 6 and the light incidence surface 31 is a closed space. The light guide lens is either glued or fastened to the encapsulant 6. Where the light guide lens is fastened to the encapsulant 6, the encapsulant 6 is formed with a fastening slot 60, allowing a fastening member 30 provided on the light guide lens to be engaged with the fastening slot 60.

Unlike the prior art wherein inefficient lateral emission of light necessitates equipping a backlight module with auxiliary structures, such as a transparent light guide plate and a reflective sheet, for prevention of hot spots, the present invention discloses a light guide lens for allowing light to exit a lens body mostly laterally by means of refraction structures and reflection structures and achieving uniform illumination from a point source. Accordingly, unlike the prior art, the present invention makes an assembly process simpler.

Loss of light energy accompanies refraction-based lateral emission of light in accordance with the prior art. By contrast, with a light guide lens of the present invention, lateral emission of light occurs whenever totally reflected light rays pass through a plane perpendicular thereto, thus minimizing the loss of light energy.

A refraction-oriented serrate outer surface of the prior art is complex and thereby difficult to fabricate. By contrast, a light guide lens of the present invention has a light emission surface provided with reflection structures and planes; each of the reflection structures is an inclined plane, whereas the planes are perpendicular to outgoing light rays; the structural simplicity decreases the number of dies used and thereby reduces manufacturing costs.

The foregoing specific embodiments are only illustrative of the features and functions of the present invention but are not intended to restrict the scope of the present invention. It is apparent to those skilled in the art that all equivalent modifications and variations made in the foregoing embodiment according to the spirit and principle in the disclosure of the present invention should fall within the scope of the appended claims.

What is claimed is:

1. A light guide lens for turning incident light rays emitted from a point source and coming in all directions into laterally exiting light rays, the light guide lens comprising:

a lens body having a light incidence surface and a light emission surface;

a plurality of refraction structures formed on the light incidence surface, adjoined each other and configured to receive and refract the incident light rays such that the incident light rays turn to the light emission surface, wherein the refraction structures have the same focus coinciding with the point source and refract the incident light rays coming in all directions into refracted parallel light rays; and a plurality of reflection structures formed on the light emission surface such that the refracted parallel light rays arriving from the refraction structures reflect off the reflection structures and laterally exit the lens body, wherein the refracted parallel light rays arriving from each of the refraction structures travel to a corresponding one of the reflection structures, such that the incident light rays exit laterally.

2. The light guide lens of claim 1, wherein the refraction structures are convex surfaces protruded from the light incidence surface, adjoin each other, and fully cover the light incidence surface so as to refract the incident light rays coming in all directions.

3. The light guide lens of claim 1, wherein the point source is a light emitting diode.

4. The light guide lens of claim 1, wherein the lens body is made of one of a resin and a transparent polymer.

5. The light guide lens of claim 1, wherein the refraction structures each comprise a convex surface with a center of curvature, the convex surface having a focus coinciding with the light source, such that the refraction structures each receive and refract the corresponding incident light rays entering the lens body, allowing the refracted light rays entered and refracted to travel parallel to an optical axis of the convex surface afterward, as expressed by equation $$\frac{u}{y} = f,$$

where $$\frac{u}{y}$$

expresses a distance between the light source and the convex surface, the equation $$\frac{u}{y} = f$$

being derived from equation $$\frac{n'-1}{r} = -\frac{u}{y},$$

the equation $$\frac{n'-1}{r} = -\frac{u}{y}$$

resulting from substitution of u'=0 and n=1 into equations as follows:

$$n'u' = nu + \frac{n'-n}{r}y \quad \text{light tracing equation}$$

$$f = \frac{-nr}{n'-n} \quad \text{focus equation}$$

with notations as follows:
- u: an included angle between a light ray from the point source and the optical axis
- u': an included angle between the refracted light ray and the optical axis
- y: a distance between a point of refraction and the optical axis
- r: radius of curvature of the convex surface
- n': refractive index of air
- n': refractive index of the lens body 6. The light guide lens of claim 1, wherein each of the refraction structures is a fresnel structure for allowing the corresponding incident light rays to travel parallel to each other and enter the lens body.

7. The light guide lens of claim 1, wherein each of the refraction structures refracts the incident light rays such that the refracted parallel light rays travel to the corresponding reflection structure.

8. The light guide lens of claim 1, wherein the reflection structures are inclined planes with slopes configured for total internal reflection of the corresponding refracted parallel light rays such that, upon total internal reflection, the corresponding refracted parallel light rays laterally exit the light guide lens.

9. The light guide lens of claim 1, wherein a portion of the refracted parallel light rays exit laterally after undergoing two total internal reflections by two reflection structures.

10. The light guide lens of claim 1, wherein the light emission surface is further formed with a plurality of planes perpendicular to the reflected light rays such that the reflected light rays penetrate the lens body and exit.

11. The light guide lens of claim 1, wherein the light emission surface further comprises a plurality of planes perpendicular to the refracted parallel light rays.

12. A light emitting diode package structure, comprising:
- a light emitting diode electrically mounted on a carrier component; and
- a light guide lens coupled to the carrier component and comprising a lens body having a light incidence surface and a light emission surface opposing thereto, wherein the light incidence surface mantles the light emitting diode and is provided with a plurality of refraction structures adjoined each other for refracting incident light rays emitted from the light emitting diode such that the incident light rays turn to the light emission surface, wherein the refraction structures have the same focus coinciding with the light emitting diode, and refracts the incident light rays coming in all directions into refracted parallel light rays, and the light emission surface is provided with a plurality of reflection structures for reflecting the refracted parallel light rays from the corresponding refraction structures into refracted parallel light rays such that the reflected light rays laterally exit the light guide lens, each of the reflection structures receiving the refracted parallel light rays from a corresponding one of the refraction structures, such that the incident light rays exit laterally.

13. The light emitting diode package structure of claim 12, wherein the carrier component is a lead frame.

14. The light emitting diode package structure of claim 12, wherein on a surface of the carrier component an encapsulant is formed for securing in position the light emitting diode, the encapsulant being coupled to the light guide lens, allowing the encapsulant and the light incidence surface of the lens body to form a closed space therebetween.

15. The light emitting diode package structure of claim 14, wherein the light guide lens is either adhered or fastened to the encapsulant.

16. The light emitting diode package structure of claim 15, wherein the encapsulant is formed with a fastening slot for being engaged with a fastening member formed on the light guide lens.

* * * * *